United States Patent [19]

Scott

[11] Patent Number: 4,697,835
[45] Date of Patent: Oct. 6, 1987

[54] COMBINED LAWN DEBRIS RECEPTACLE-TARGET APPARATUS

[76] Inventor: Menzy Scott, 382 Valley Scent Ave., Scotch Plains, N.J. 07076

[21] Appl. No.: 358,590

[22] Filed: Mar. 16, 1982

Related U.S. Application Data

[63] Continuation-in-part of Ser. No. 260,326, May 4, 1981.

[51] Int. Cl.⁴ .............................................. B62B 11/00
[52] U.S. Cl. ................................... 294/55; 280/47.26; 280/654
[58] Field of Search ................. 294/55, 1 R; 15/257.1, 15/257.7, 257.9, 104.8; 248/97, 99; 280/47.26, 47.24, 47.31, 47.33, 652, 654; 273/181 F, 127 R, 181 R, 35 R, 26 A

[56] References Cited

U.S. PATENT DOCUMENTS

| | | |
|---|---|---|
| 112,727 | 3/1881 | Lum . |
| 1,167,782 | 1/1916 | Richards . |
| 1,182,412 | 5/1916 | Olesburg . |
| 1,923,152 | 8/1933 | Kohn . |
| 2,397,921 | 4/1946 | Cole . |
| 2,819,903 | 1/1958 | Saunders . |
| 2,827,297 | 3/1958 | Foster . |
| 3,106,303 | 10/1963 | Finocchiaro . |
| 3,312,471 | 4/1967 | Nissen . |
| 3,388,919 | 6/1968 | Waag ................................... 280/654 |
| 3,575,415 | 4/1971 | Fulp . |
| 3,754,785 | 8/1973 | Anderson . |
| 3,802,703 | 4/1974 | Van Tassel . |
| 3,810,616 | 5/1974 | Murphy . |
| 3,822,883 | 7/1974 | De Vas . |
| 3,875,981 | 4/1975 | Brenner et al. . |
| 3,936,068 | 2/1976 | Dorman ........................ 280/47.26 |
| 3,936,087 | 2/1976 | Alexander . |
| 3,939,803 | 1/1976 | Paulus . |
| 4,006,928 | 2/1977 | Beugin . |
| 4,336,951 | 6/1982 | Crothers .......................... 280/47.26 |

Primary Examiner—James B. Marbert
Attorney, Agent, or Firm—R. Martin Oliveras

[57] ABSTRACT

A combination lawn debris receptacle-target apparatus for facilitating the accumulation, collection, and bagging of outdoor debris and which coverts to a recreational target comprises: a rear frame structure; a front guide-holder structure; a front wheel-support structure; and a plurality of joint locations for connecting adjacent elements of the apparatus. In particular, the rear frame structure includes: rear, central lower, and side upper and lower straight members; the guide-holder structure includes: upper and lower connecting straight members, and side U-shaped members; the wheel-support structure includes: a lower straight member and wheels at the ends of such lower straight member; and the plurality of joint locations includes: means for mutually connecting ends or other portions of apparatus members. The joint locations are such that the rear ends of the central lower straight members may move axially and may rotate relative to the rear straight member; and the front ends of the central lower straight members may be disconnected whereby the lawn debris receptacle configuration may be converted to the recreational target configuration. A feature of the present invention is that the rear frame structure side lower and central lower straight members provide both structural support and debris weight support; and that the guide-holder structure provides structural support, means for guiding the debris in the forward direction, and means for removably attaching the bag to the apparatus.

7 Claims, 6 Drawing Figures

COMBINED LAWN DEBRIS RECEPTACLE-TARGET APPARATUS

OTHER RELATED APPLICATIONS

This application is a continuation in part of application Ser. No. 06/260,326, filed on 5/4/81 by applicant herein and entitled "Lawn Debris Accumulation And Collection Apparatus".

FIELD OF THE INVENTION

This invention relates to a lawn debris accumulation, collection, and bagging apparatus which is convertible to a recreational target apparatus.

DESCRIPTION OF THE PRIOR ART

Many prior art apparatus have been disclosed for use in conjunction with a flexible bag, or for otherwise accumulating or collecting debris or other matter. For example:

Lum U.S. Pat. No. 112,727 entitled "Bag Holder" discloses shovel A, handle B, and flexible or slack bag C for holding and filling a bag with grain or other substances;

Richards U.S. Pat. No. 1,167,782 entitled "Grain Scoop" discloses a scoop-like structure including flat bottom member 10, vertical side members 11, upwardly bowed handle 14, and bag 18;

Olesburg U.S. Pat. No. 1,182,412 entitled "Combination Scoop And Sack Filler" discloses substantially semi-cylindrical member 10, first handle 21, and second handle 22;

Finocchiaro U.S. Pat. No. 3,106,303 entitled "Collapsible Cart" discloses cart 10, frames 18 and 20, wheels 30, and sheet material 24 and 26;

Anderson U.S. Pat. No. 3,754,785 entitled "Portable Bag Holder" discloses frame side elments 22, upper frame elements 20, lower support portion 12, lip 16, parallel members 24, and bag B;

Brenner and Hunt U.S. Pat. No. 3,875,981 entitled "Multi-Position Garden Cart" discloses garden cart A, bin B, parallel laterally spaced frames C, first elongate member D, transversely aligned sleeves or bearings E, wheels F, U-shaped handle G, and hollow rigid frame H;

Paulus U.S. Pat. No. 3,939,803 entitled "Bag Distending and Supporting Apparatus" discloses bag B, and bag support 10 further including base portion 11, ends 12 and 13, guide slots 14 and 15, and stretcher member 18;

Alexander U.S. Pat. No. 3,936,087 entitled "Collection Receptacle" discloses collection receptacle 10, leaf and garden bag 11, base portion 14, top and bottom edges 16 and 17, side edges 18 and 19, stiffener rib portion 25, and scraper tray 30; and Beugin U.S. Pat. No. 4,006,928 entitled "Lawn Bag Caddy" discloses leg 10, legs 30, resilient sleeve 20, transverse opening 40, legs 18, and lawn bag 44.

Several prior art apparatus have been disclosed for use as a recreational target or the like. For example:

Kohn U.S. Pat. No. 1,923,152 entltled "Golf Practice Apparatus" discloses target 10, base member 17, and screens 40 and 41;

Cole U.S. Pat. No. 2,397,921 entitled "Shot Trap For Air Rifle Targets" discloses hood or flexible fabric 10, arms 22, rod 25, cross-piece 17, and U-shaped supporting base 24;

Saunders U.S. Pat. No. 2,819,903 entitled "Target With Projectile Stop" discloses protective screen 18, cross bar 17, base 13, and uprights 14;

Foster U.S. Pat. No. 2,827,297 entilted "Target" discloses target 28, side support panels 24 and 26, and target sheet 50;

Nissen U.S. Pat. No. 3,312,471 entitled "Target For Trampoline Game Apparatus" discloses auxiliary targets 32, auxiliary gantry 35, gantry 21, uprights 22, protective feet 30, target 16, and cross bars 26;

Fulp U.S. Pat. No. 3,575,415 entitled "Pocketed Ball-Receiving Target" discloses bottom plate 16, front frame member 10, top rail 14, upstanding side rails, and rearwardly extending support frame 40.

Van Tassle U.S. Pat. No. 3,802,703 entitled "Ball Throwing Target, Retrieving Bin, And Court" discloses ball retrieving frame 11, ball directing member 22, hoop 12, and ball bin 21;

Murphy U.S. Pat. No. 3,810,616 entitled "Target Apparatus With Ball Catching Means" discloses simulated target apparatus 10, large molded sheet 11, rim 17, face 26, bottom chordal base segment 20, and foldable brace 36; and De Vos U.S. Pat. No. 3,822,883 entitled "Compartmented Target And Play Field" discloses target 10, net 16, stays 18, and partition means 17.

From the above it is apparent that the prior art lawn debris receptacle apparatus do not afford combined structural support and debris weight support; nor do they afford combined structural support, a debris guide function, and bag attachment function as does the present invention. Also, the prior art lawn debris receptacle apparatus are not convertible to a recreational target apparatus nor are the prior art recreational target apparatus convertible to a lawn debris receptacle apparatus.

Objects of the present invention are therefor to provide an apparatus which:

allows for holding and filling an associated bag;

allows for one person to move debris and deposit same into an associated bag in one continuous operation;

is simple, economical, and lightweight for allowing the accumulation, collection, and depositing of debris into an associated bag;

allows for maintaining the mouth of the associated bag open in a vertical plane;

allows for collection, receiving, and bagging of lawn debris;

effects the above objects and which may be shipped disassembled, may be easily assembled, and later may be redisassembled for storage; and which is ccnvertible to a recreational target apparatus.

SUMMARY OF THE PRESENT INVENTION

According to the present invention, a combination lawn debris receptacle-target apparatus comprises: a rear frame structure; a front guide-holder structure; a front wheel-support structure; and a plurality of joint locations for connecting adjacent elements of the apparatus. In particular, the rear structure includes: rear, central lower, and side upper and lower straight members; the guide-holder structure includes: upper and lower connecting straight members, and side U-shaped members; the wheel-support structure includes: a lower straight member, and wheels at the ends of such lower straight member; and the plurality of joint locations includes: means for mutually connecting ends or other portions of apparatus members. The joint locations are such that the rear ends of the central lower straight members are movable axially and rotatable relative to the rear straight member; and the front ends of the central lower straight members are disconnectable whereby the lawn debris receptacle configuration is convertible to the recreatianal target configuration.

Features of the present invention are therefor tbat:

the rear straight member and the side upper and lower straight members share common joint locations at the rear end of said apparatus;

the central lower straight members serve the dual function of structural support and debris weight support;

the side upper straight members and the guide-holder structure share common joint locations at the upper vertical portions of said guide-holder structure;

the side lower straight members and the wheel-support structure share common joint locations at the lower straight member of said wheel-support structure;

the side upper straight members are longer than the side lower straight members such that the guide-holder structure is in a vertical plane;

the side upper and lower straight members, the rear straight member, and the guide-holder structure further include means for attaching an associated canvas or plastic sheet to the apparatus;

the rear straight member is longer than the distance between the side upper straight members-guide holder structure joint locations and the distance between the side lower straight members-wheel support structure joint locations such that the debris is concentrated and directed onto the opening of the guide-holder structure;

the common joint locations of the rear straight member and the side upper and lower straight members may include means for allowing transporting of the overall apparatus and debris load;

the joint locations of the central lower straight members and the middle portion of the rear straight member may include means for allowing assisted towing of the overall apparatus and debris load; and the central lower straight members-rear straight member joint locations are movable axially along the rear straight member; the central lower straight members are rotable relative to the rear straight member; and the central lower straight member-wheel support structure joint locations are disconnectable.

Advantages of the present invention are therefor that such apparatus is simple, economical, lightweight, and easy to manufacture, assemble, disassemble, and store.

DESCRIPTION OF THE DRAWING

The above and other objects, features, and advantages of the present invention will be better appreciated by a reading of the following detailed description and the drawing in which:

FIG. 1 is a perspective view looking in the rear direction of combination lawn debris receptacle-target apparatus 10 according to the present invention in the lawn debris receptacle configuration comprising: rear frame structure 20; joint locations 30; guide-holder structure 40; and wheel-support structure 50. For purposes of description only, the end of apparatus 10 including guide-holder structure 40 is referred to as the front end and the other end is referred to as the rear end.

Figure 1:
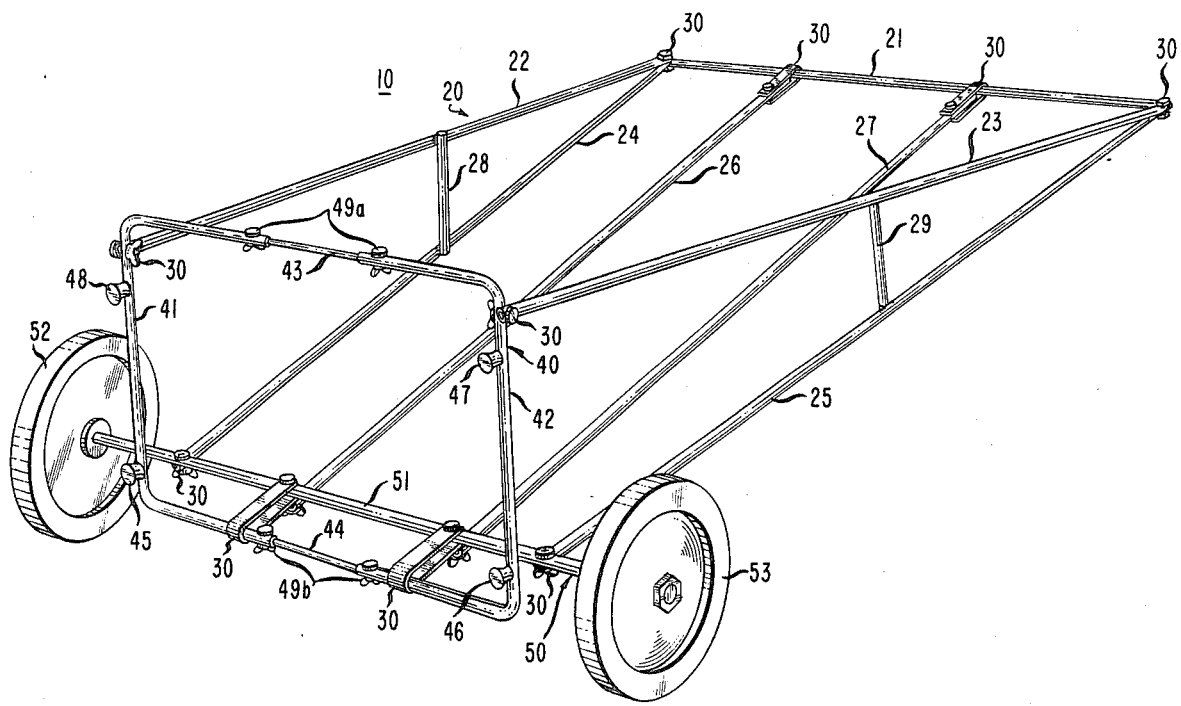
FIG. 1 is a perspective view looking in the rear direction of the present invention in the lawn debris receptacle configuration without the associated canvas or plastic sheet and without the associated plastic bag.

Rear frame structure 20 further comprises: rear lateral horizontal straight member 21; side left and right upper longitudinal straight members 22 and 23, respectively; side left and right lower horizontal straight members 24 and 25, respectively; and central left and right lower horizontal straight members 26 and 27, respectively. The longitudianl direction is defined from front to rear and the lateral direction is defined horizontal and perpendicular to such longitudinal direction. Members 21 through 27 may be made of tubular material such as aluminum, plastic, or any other material or configuration to meet the specific need and application.

Guide-holder structure 40 further comprises: U-shaped side left and right members 41 and 42, respectively; and horizontal upper and lower connecting straight members 43 and 44, respectively. Members 41 through 44 may be made similarly to members 21 through 27. Members 41, 42, and 43 may be held together by bolt-wingnut combinations 49a; and members 41, 42, and 44 my be held together by bolt-wingnut combinations 49b.

Apparatus 10 may further include left and right vertical interconnecting members 28 and 29, respectively, for connecting members 22 and 24, and members 23 and 25.

Wheel-support structure 50 further comprises: bottom lateral horizontal straight member 51; and vertical left and right wheels 52 and 53, respectively, attached to the ends of member 51.

Figure 2:
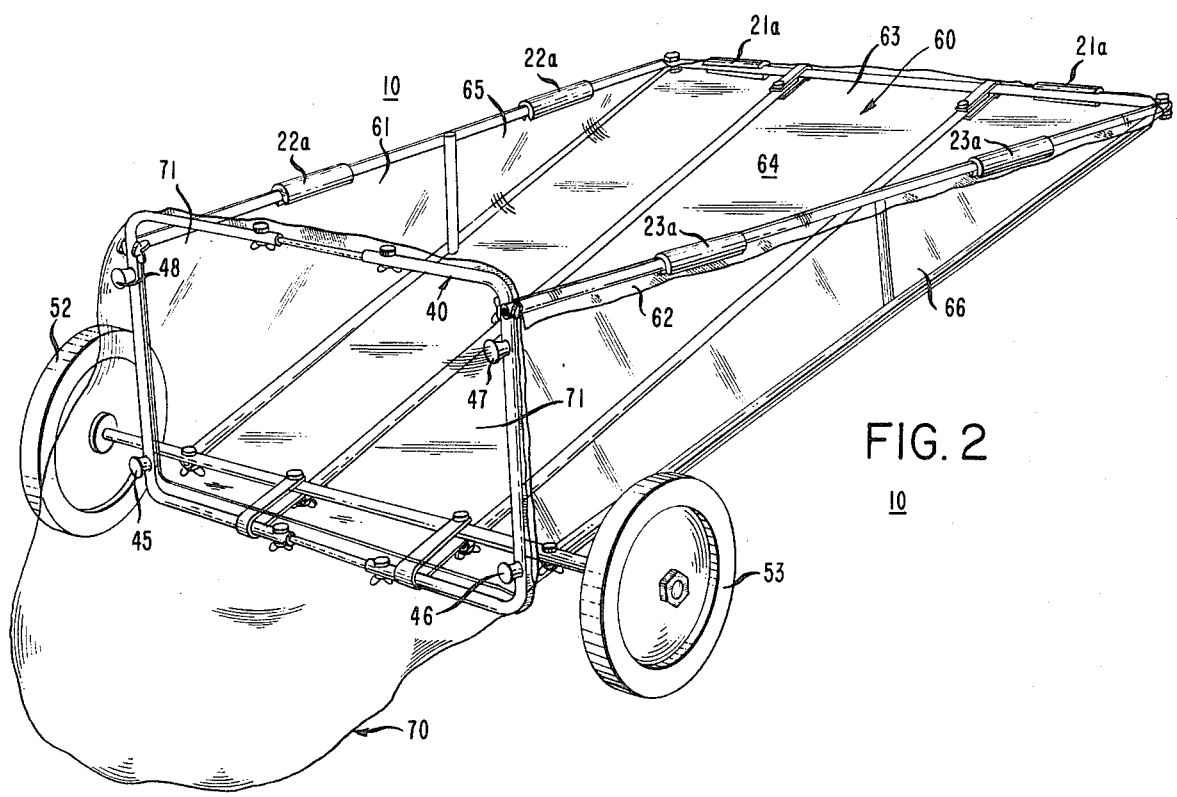
FIG. 2 is a perspective view looking in the rear direction of the present invention in the lawn debris receptacle configuration including such associated canvas or plastic sheet and including such associated plastic bag.

FIG. 2 is a perspective view looking in the rear direction of apparatus 10 according to the present invention in the lawn debris receptacle configuration including associated canvas or plastic sheet 60 and associated flexible plastic bag 70. Members 22 and 23 respectively have associated therewith snap or other means 22a and 23a along the lengths thereof for effecting attachment of edges 61 and 62 of sheet 60 to members 22 and 23. Similarly, member 21 has associated therewith snap or other means 21a along the length thereof for effecting attachment of edge 63 of sheet 60 thereto. Accordingly, horizontal area 64 and left and right vertical areas 65 and 66, respectively, of sheet 60 contain and direct the debris from the rear of apparatus 10 to the front of same and also guide the debris onto structure 40. Further, mouth area 71 of bag 70 fits over members 41 through 44 with its own tension or applied tension via means such as at locations 45 through 48 to maintain bag 70 attached to apparatus 10 during the overall operation such that the mouth area is in a vertical plane perpendicular to the longitudinal direction. It is apparent that central lower straight members 26 and 27 provide weight support for the debris located on area 64 of sheet 60 and also provide structural support to apparatus 10.

Figure 3:
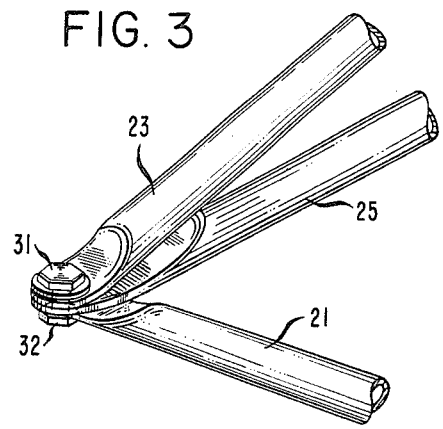
FIG. 3 is illustrative of the joint connections at the lateral ends of the rear straight member.

FIG. 3 illustrates the joint connections between member 21 and members 23 and 25 at the rear end of apparatus 10 and at the left and right ends of member 21. The ends of such members may be flattened, stacked upon one another, and fixedly connected to each other by means of bolt 31 and nut 32. A similar explanation applies to members 22 and 24.

Figure 4:
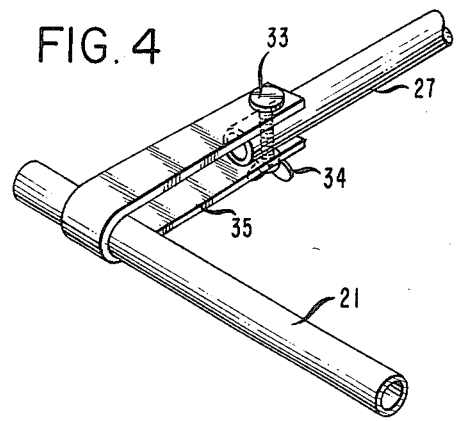
FIG. 4 is illustrative of the central lower straight members-rear straight member joint connections.

FIG. 4 illustrates the central lower straight members-rear straight member joint connections. Member 27 is connected to member 21 via U-shaped metal piece 35 which is wrapped around member 21 and which is fixedly connected to member 27 by bolt 33 and wingnut 34. A similar explanation applies to member 26. It will be apparent that this arrangement allows for axial and rotational motion of members 26 and 27 relative to member 21.

Figure 5:
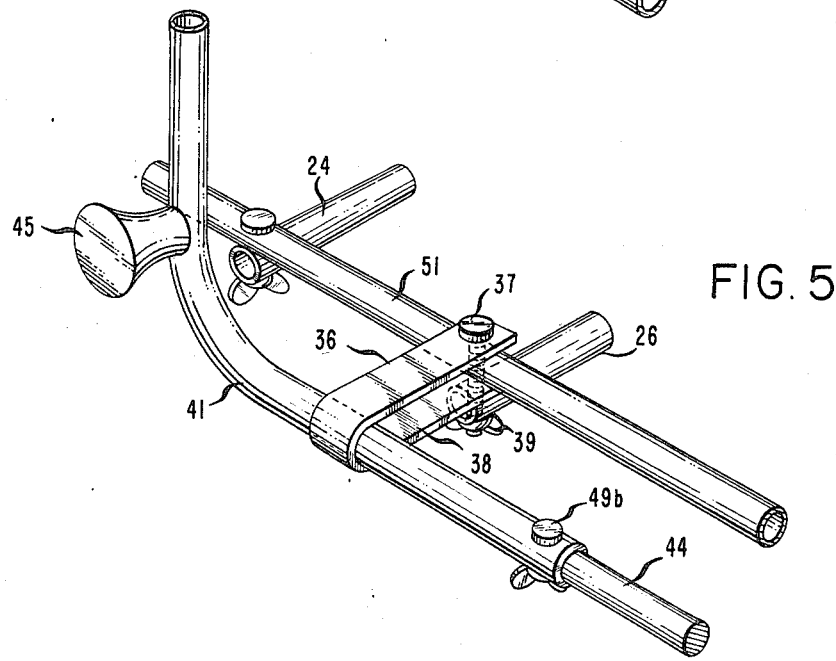
FIG. 5 is illustrative of the central lower straight members-guide holder structure-wheel support structure joint connections.

FIG. 5 illustrates the central lower straight members-guide holder structure-wheel support structure joint connections. Member 26 is fixedly connected to member 51 at the bottom portion thereof by means of bolt 37 and nut 39. Member 51 is connected to member 41 by means of U-shaped metal piece 36 wrapped around member 41, appropriately shaped intervening metal block 38, and bolt 37-nut 39 combination. A similar explanation applies to members 27 and 42.

The joint connections between members 24, 25, and 51; and between members 22, 23, 41, and 42 are similarly effected using a bolt and a wingnut wherein the front ends of members 22 through 25 may be flattened.

The operation of apparatus 10 is such that the operator sweeps or rakes the debris onto apparatus 10 from the rear to the front direction onto area 64 to accumulate and collect such debris thereon. The operator then effects forward movement of the debris along area 64, along guide-holder structure 40, and into bag 70. The operator may then remove and replace bag 70 as needed.

Apparatus 10 may further include means at the common joint connections of member 21 and members 22 through 25 such as a handle for allowing manual transporting of apparatus 10 and the debris thereon. Further, apparatus 10 may further include means at the common joint connections of members 21, 26, and 27 such as a longitudinal bar for allowing assisted towing of apparatus 10 and the debris thereon.

Apparatus 10 has been described as a lawn apparatus for accumulating, collecting, and bagging grass, twigs, leaves or the like. However, it will be apparent that apparatus 10 may be utilized to accumulate, collect, and bag any debris or material such as garbage, sand, etc.

It is apparent that the lenght of member 21 is greater than the lateral distances between joint connections at the front ends of members 22, 23, 24, and 25. It is also apparent that the lenght of members 22 and 23 is greater than the length of members 24 and 25, and members 26 and 27.

Figure 6:
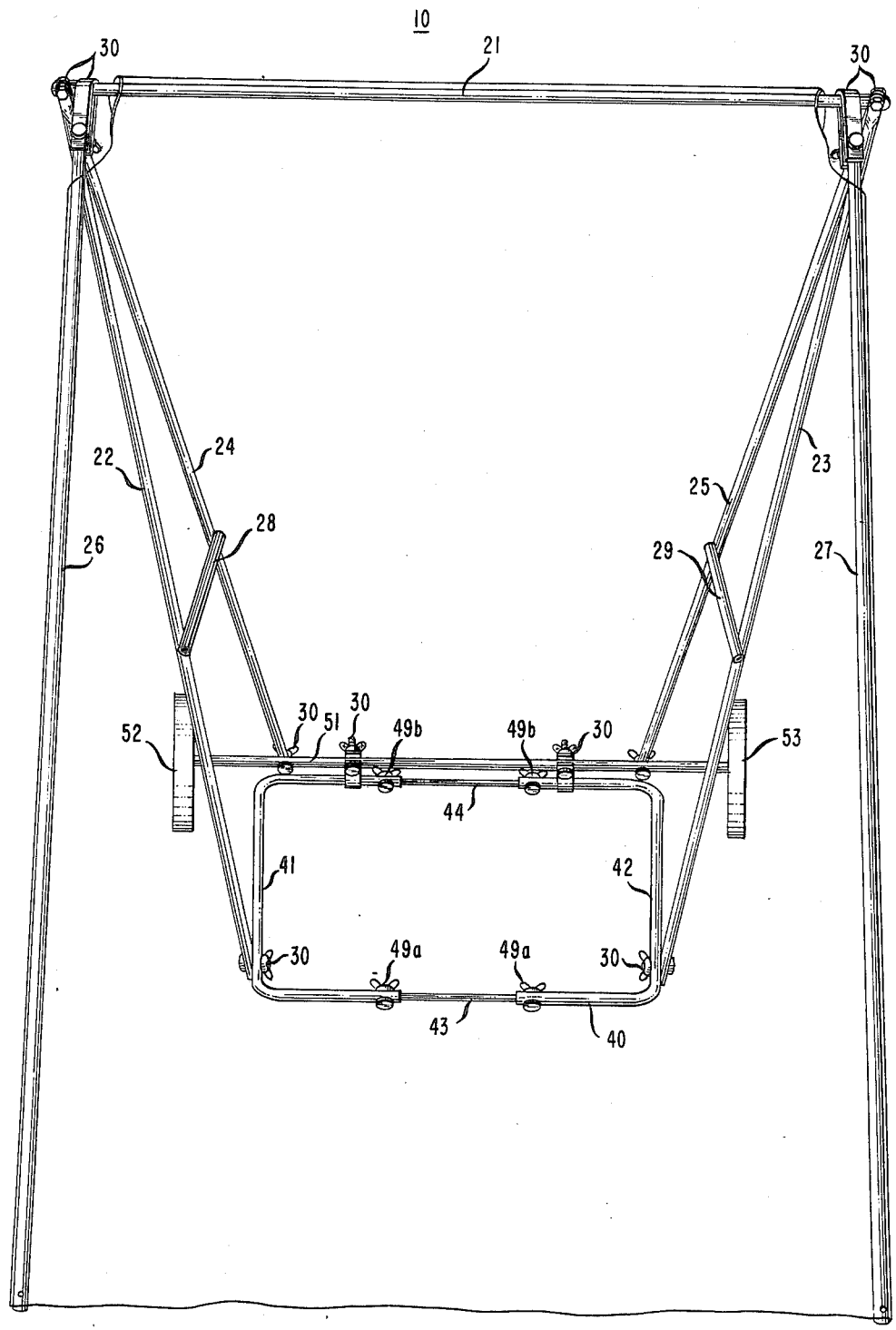
FIG. 6 is a perspective view looking in the front direction of the present invention in the recreational target configuration without the associated canvas or plastic sheet and without the associated plastic bag.

FIG. 6 is a perspective view looking in the front direction of apparatus 10 in the recreational target configuration without the associated canvas or plastic sheet and without the associated plastic bag. The rear ends of members 26 and 27 are moved laterally relative to member 21 and rotated relative to member 21 in a direction away from member 51. The front ends of members 26 and 27 are disconnected relative to member 51. Thereafter the upper portion of guide-holder structure 40 and the front ends of members 26 and 27 are placed on the ground. The front ends of members 26 and 27 may be fixedly connected to the ground by means of spikes, not shown. Accordingly, a ball or other projectile used for practice by the operator may be hurled at apparatus 10 whereby such ball strikes sheet 60, not shown, and is directed onto guide-holder structure 40 and into associated plastic bag 70, also not shown, for retrieval.

While the arrangement according to the present invention has been described in terms of a specific illustrative embodiment, it will be apparent to those skilled in the art that many modifications are possible within the spirit and scope of the disclosed principle.

What is claimed is:

1. An apparatus having a front end and a rear end comprising:
    a guide-holder structure being located at the front end of said apparatus and defining a front opening which is perpendicular to the longitudinal direction of said apparatus, said longitudial direction being defined as the front to rear direction;
    a frame structure being located at the rear end of said apparatus, said guide-holder structure being connected to the front end of said frame structure and first and second connection locations;
    a wheel-support structure being connected to said guide-holder structure by first and second connection means and connected to the front end of said frame structure at third and fourth connection locations.

2. The apparatus of claim 1 wherein said wheel-support structure is further connected to said frame structure at fifth and sixth connection locations located in between said third and fourth connection locations and wherein said first and second connection means connect said fifth and sixth connection locations on said wheel-support structure to seventh and eighth connection locations on said guide-holder structure.

3. The apparatus of claim 2 wherein said guide-holder structure further comprises: first and second U-shaped members located in a vertical plane perpendicular to said longitudinal direction, said first and seventh connection locations being located on said first U-shaped member and said second and eighth connection locations being located on said second U-shaped member, said first and second connection locations being located on the upper portions of said first and second U-shaped members, respectively, and said seventh and eighth connection locations being located on the lower portions of said first and second U-shaped members, respectively; and first interconnecting means connecting the upper portions and second interconnecting means connecting the lower portions of said first and second U-shaped members, respectively.

4. The apparatus of claim 2 wherein said frame structure further comprises: a rear lateral horizontal member; a first longitudinal member connecting said first connection location to a ninth connection location on said rear lateral member and a second longitudinal member connecting said second connection location to a tenth connection location on said rear lateral member; a first horizontal member connecting said third connection location to said ninth connection location and a second horizontal member connecting said fourth connection location to said tenth connection location, and a third horizontal member connecting said fifth connection location to an eleventh connection location on said rear lateral member and a fourth horizontal member connecting said sixth connection location to a twelfth connection location on said rear lateral member.

5. The apparatus of claim 4 wherein: the rear ends of said third and fourth horizontal members at said eleventh and twelfth connection locations, respectively, are movable laterally and rotable relative to said rear lateral member; and the front ends of said third and fourth horizontal members are readily disconnectable from said fifth and sixth connection locations, respectively, such that the front ends of said third and fourth horizontal members and said first interconnecting means may be placed on a common plane.

6. The apparatus of claim 4 wherein the distance between said ninth and tenth connection locations is greater than the distance between said first and second connection locations and the distance between said third and fourth connection locations.

7. The apparatus of claim 2 wherein said wheel-support structure further comprises: a lateral horizontal member being perpendicular to said longitudinal direction and being connected to said guide-holder structure by said first and second connection means and being connected to said frame structure at said third, fifth, sixth, and fourth connection locations; and first and second wheel members being respectively connected to the ends of said wheel-suuport structure lateral member, said first and second wheel members being parallel to said longitudinal direction.

* * * * *